United States Patent
Crain (10) Patent No.: US 10,707,741 B2
(45) Date of Patent: Jul. 7, 2020

(54) VOLTAGE GENERATOR AND A METHOD OF MAKING A VOLTAGE GENERATOR

(71) Applicant: Polaris Industries Inc., Medina, MN (US)

(72) Inventor: Stephen G. Crain, Wyoming, MN (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 15/653,277

(22) Filed: Jul. 18, 2017

(65) Prior Publication Data

US 2019/0028013 A1  Jan. 24, 2019

(51) Int. Cl.
*H02K 47/06* (2006.01)
*H02K 3/28* (2006.01)
(Continued)

(52) U.S. Cl.
CPC ............ *H02K 47/06* (2013.01); *H02K 1/276* (2013.01); *H02K 3/28* (2013.01); *H02K 15/045* (2013.01);
(Continued)

(58) Field of Classification Search
CPC ....... H02M 7/003; H02M 2007/53876; H02M 7/493; H02K 47/06; H02K 1/276;
(Continued)

(56) References Cited

U.S. PATENT DOCUMENTS 3,809,995 A   5/1974   Hardin
3,962,621 A   6/1976   Raver
(Continued)

FOREIGN PATENT DOCUMENTS

DE   102013218596   4/2015
EP      0569278     7/1996
(Continued)

OTHER PUBLICATIONS

International Search Report issued by the International Searching Authority, dated Oct. 2, 2018, for International Patent Application No. PCT/US2018/042373; 10 pages.
(Continued)

*Primary Examiner* — Nguyen Tran
*Assistant Examiner* — Demetries A Gibson
(74) *Attorney, Agent, or Firm* — Faegre Drinker Biddle & Reath LLP (57) ABSTRACT

A generator to generate electrical power from rotational motion and a method of making the generator. The generator includes a rotor including a plurality of magnetic poles; and a stator including a magnetic core comprising a body and teeth extending radially from the body and defining a plurality of slots therebetween. The stator also includes a first three-phase winding and a second three-phase winding, each of the first three-phase winding and the second three phase winding including first, second, and third phase windings comprised of coils individually wound around each of the teeth. At least two coils of each of the first, second, and third phase windings of the first three-phase winding and the second three phase winding are individually wound on teeth positioned next to each other.

13 Claims, 9 Drawing Sheets

(51) Int. Cl.
*H02K 19/34* (2006.01)
*H02K 1/27* (2006.01)
*H02K 15/04* (2006.01)
*H02K 19/10* (2006.01)
*H02K 19/24* (2006.01)
*H02K 3/18* (2006.01)

(52) U.S. Cl.
CPC .......... *H02K 19/103* (2013.01); *H02K 19/24* (2013.01); *H02K 19/34* (2013.01); *H02K 3/18* (2013.01)

(58) Field of Classification Search
CPC .... H02K 15/045; H02K 19/103; H02K 19/24; H02K 21/22; H02K 21/48; H02K 3/18; H02K 3/28
See application file for complete search history.

(56) References Cited

U.S. PATENT DOCUMENTS

| | | | |
|---|---|---|---|
| 3,984,750 A | 10/1976 | Pfeffer | |
| 4,517,507 A | 5/1985 | Nordbrock | |
| 4,539,515 A | 9/1985 | Morishita | |
| 4,677,365 A | 6/1987 | Yang | |
| 4,694,238 A | 9/1987 | Norton | |
| 5,274,322 A | 12/1993 | Hayashi | |
| 5,444,355 A | 8/1995 | Kaneyuki | |
| 5,682,070 A | 10/1997 | Adachi | |
| 5,705,917 A | 1/1998 | Scott | |
| 5,719,486 A | 2/1998 | Taniguchi | |
| 6,166,471 A * | 12/2000 | Kometani | H02K 3/28 310/179 |
| 6,373,230 B2 | 4/2002 | Jabaji | |
| 6,555,992 B2 | 4/2003 | Asao | |
| 7,030,533 B2 | 4/2006 | Umeda | |
| 7,170,261 B2 | 1/2007 | Walter | |
| 7,414,326 B2 | 8/2008 | Montgomery | |
| 7,545,125 B2 | 6/2009 | Wolf | |
| 7,782,023 B2 | 8/2010 | Holguin | |
| 8,256,459 B2 | 9/2012 | Crain | |
| 8,269,457 B2 | 9/2012 | Wenger | |
| 8,350,530 B2 | 1/2013 | Stockman | |
| 8,519,590 B2 | 8/2013 | Baba | |
| 9,096,133 B2 | 8/2015 | Kohler | |
| 9,216,637 B2 | 12/2015 | Crain | |
| 9,641,008 B2 | 5/2017 | Gati | |
| 2004/0090136 A1* | 5/2004 | Uemura | H02K 21/222 310/156.26 |
| 2006/0097599 A1* | 5/2006 | Takeuchi | H02K 21/22 310/184 |
| 2007/0057592 A1 | 3/2007 | Bhargava | |
| 2007/0194650 A1* | 8/2007 | Ito | H02K 3/28 310/179 |
| 2007/0205685 A1* | 9/2007 | Kuwano | H02K 5/148 310/148 |
| 2008/0185933 A1* | 8/2008 | Baba | H02K 3/18 310/198 |
| 2009/0184599 A1* | 7/2009 | Kanazawa | H02K 1/148 310/195 |
| 2011/0043069 A1* | 2/2011 | Tanaka | H02K 3/28 310/198 |
| 2011/0050138 A1 | 3/2011 | Li | |
| 2012/0217749 A1* | 8/2012 | Castelli Dezza | H02P 9/305 290/44 |
| 2013/0049498 A1 | 2/2013 | Boughtwood | |
| 2014/0346910 A1* | 11/2014 | Nakano | H02K 21/16 310/156.01 |
| 2017/0237377 A1* | 8/2017 | Furukawa | H02P 29/00 318/564 |
| 2018/0351482 A1* | 12/2018 | Kanazawa | B62D 5/0487 |
| 2019/0036399 A1* | 1/2019 | Yamada | H02K 1/24 |
| 2019/0036406 A1* | 1/2019 | Nakahara | H02K 1/146 |

FOREIGN PATENT DOCUMENTS

| | | |
|---|---|---|
| TW | 457194 | 10/2001 |
| WO | WO2016016524 | 2/2016 |

OTHER PUBLICATIONS

Written Opinion of the International Searching Authority, dated Oct. 2, 2018, for International Patent Application No. PCT/US2018/042373; 9 pages.

Charging Rectifiers, Kraft Powercon, kraftpowercon.com, Nov. 11, 2012.

Balmar Max Charge MC-614, Balmar & reg;, bruceschwab.com, Aug. 31, 2011.

New Tools for Managing Your Battery Bank, Sherman, Cruising World, cruisingworld.com, Mar. 13, 2012.

* cited by examiner

VOLTAGE GENERATOR AND A METHOD OF MAKING A VOLTAGE GENERATOR

CROSS-REFERENCE TO RELATED APPLICATIONS

None.

FIELD OF THE DISCLOSURE

This disclosure relates to an electromechanical machine, and more specifically to a generator including a rotor and a stator.

BACKGROUND OF THE DISCLOSURE

A rotor comprising magnetic poles generates alternating current in three-phase windings wound on a magnetic core as the magnetic poles pass near the windings when the rotor rotates. Two three-phase windings may be wound on the magnetic core to generate independent three-phase voltages. Each of the phases of the three-phase windings may comprise one or more coils. As the number of coils increase, it becomes increasingly more difficult to wind conductors to form the three-phase windings. Additional space may be required to connect the various coils forming windings to outputs of the generator, which may undesirably increase the size of the generator.

Generators may be mounted on vehicles of various types. Examples of vehicles include automobiles, motorcycles, all-terrain wheeled vehicles, utility vehicles, motor boats, and suitable means of transportation. Such generators may be mechanically driven, directly or indirectly, by a combustion engine or other rotating parts of the vehicle.

SUMMARY OF DISCLOSED EMBODIMENTS

A generator to generate electrical power from rotational motion, and a method of manufacturing the generator, are provided. In some embodiments, the generator comprises a rotor including a plurality of magnetic poles; and a stator including a magnetic core comprising a body and teeth extending radially from the body and defining a plurality of slots therebetween, the stator also comprising a first three-phase winding and a second three-phase winding, each of the first three-phase winding and the second three phase winding comprising first, second, and third phase windings comprised of coils individually wound around each of the teeth. At least two coils of each of the first, second, and third phase windings of the first three-phase winding and the second three phase winding are individually wound on teeth positioned next to each other.

In some embodiments, the generator comprises a rotor including a plurality of magnetic poles; a stator including a magnetic core comprising a body and teeth extending radially from the body and defining a plurality of slots therebetween, the stator also comprising a first three-phase winding and a second three-phase winding, each of the first three-phase winding and the second three phase winding comprised of coils individually wound around each of the plurality of teeth. The first three-phase winding comprises a first phase winding including at least a first coil and a second coil wound in opposite directions around teeth positioned next to each other. The generator has a pitch factor between, and inclusive, 0.60 to 1.50. The generator also comprises a first AC/DC converter electrically coupled to the first three-phase winding; and a second AC/DC converter electrically coupled to the second three-phase winding. Outputs of the first AC/DC converter and the second AC/DC converter are connected in parallel to a load.

In some embodiments, the generator comprises a rotor including a plurality of magnetic poles; a stator including a magnetic core comprising a body and teeth extending radially from the body and defining a plurality of slots therebetween, the stator also comprising a first three-phase winding and a second three-phase winding, each of the first three-phase winding and the second three phase winding comprised of coils individually wound around each of the plurality of teeth. The generator has a pitch factor between 0.5 and 0.75, not inclusive. The stator comprises a first half and a second half and the majority of the coils of the first three-phase winding are wound in the first half.

In some embodiments, a method of manufacturing a generator comprises providing a rotor including a plurality of magnetic poles; providing a magnetic core comprising a body and teeth extending radially from the body and defining a plurality of slots therebetween; and individually winding first, second, and third phase conductors of a first three-phase winding around each of the teeth to form coils, each of the first, second, and third phase windings comprising at least two coils individually wound on teeth positioned next to each other.

In some embodiments, a generator to generate electrical power from rotational motion comprises a rotor including a plurality of magnetic poles; and a stator including a magnetic core comprising a body and teeth extending radially from the body and defining a number of slots therebetween, the stator also comprising a first three-phase winding and a second three-phase winding, each of the first three-phase winding and the second three phase winding comprising first, second, and third phase windings comprised of coils individually wound around each of the teeth. The ratio of the magnetic poles to the slots is $2/3$, the number of slots is even, the magnetic core comprises a first radially spanning half opposite a second radially spanning half, and a majority of the coils of the first three-phase winding are individually wound on teeth positioned on the first half of the magnetic core.

DESCRIPTION OF THE DRAWINGS

The features and advantages of the disclosure will become more readily appreciated as the same become better understood by reference to the following detailed description when taken in conjunction with the accompanying drawings, where.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION

For the purposes of promoting an understanding of the principles of the invention, reference will now be made to the embodiments illustrated in the drawings, which are described below. The embodiments disclosed herein are not intended to be exhaustive or limit the claims to the precise form disclosed in the following detailed description. Rather, the embodiments are chosen and described so that others skilled in the art may utilize their teachings. It will be understood that no limitation of the scope of the claims is thereby intended. The present invention includes any alterations and further modifications in the illustrated devices and described methods and further applications of the disclosed principles which would normally occur to one skilled in the art to which the disclosure relates.

Except where a contrary intent is expressly stated, terms are used in their singular form for clarity and are intended to include their plural form.

As used herein, the terms "comprises," "comprising," "containing," and "having" and the like denote an open transition meaning that the claim in which the open transition is used is not limited to the elements following the transitional term. The terms "consisting of" or "consists of" denote closed transitions.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Figure 1:
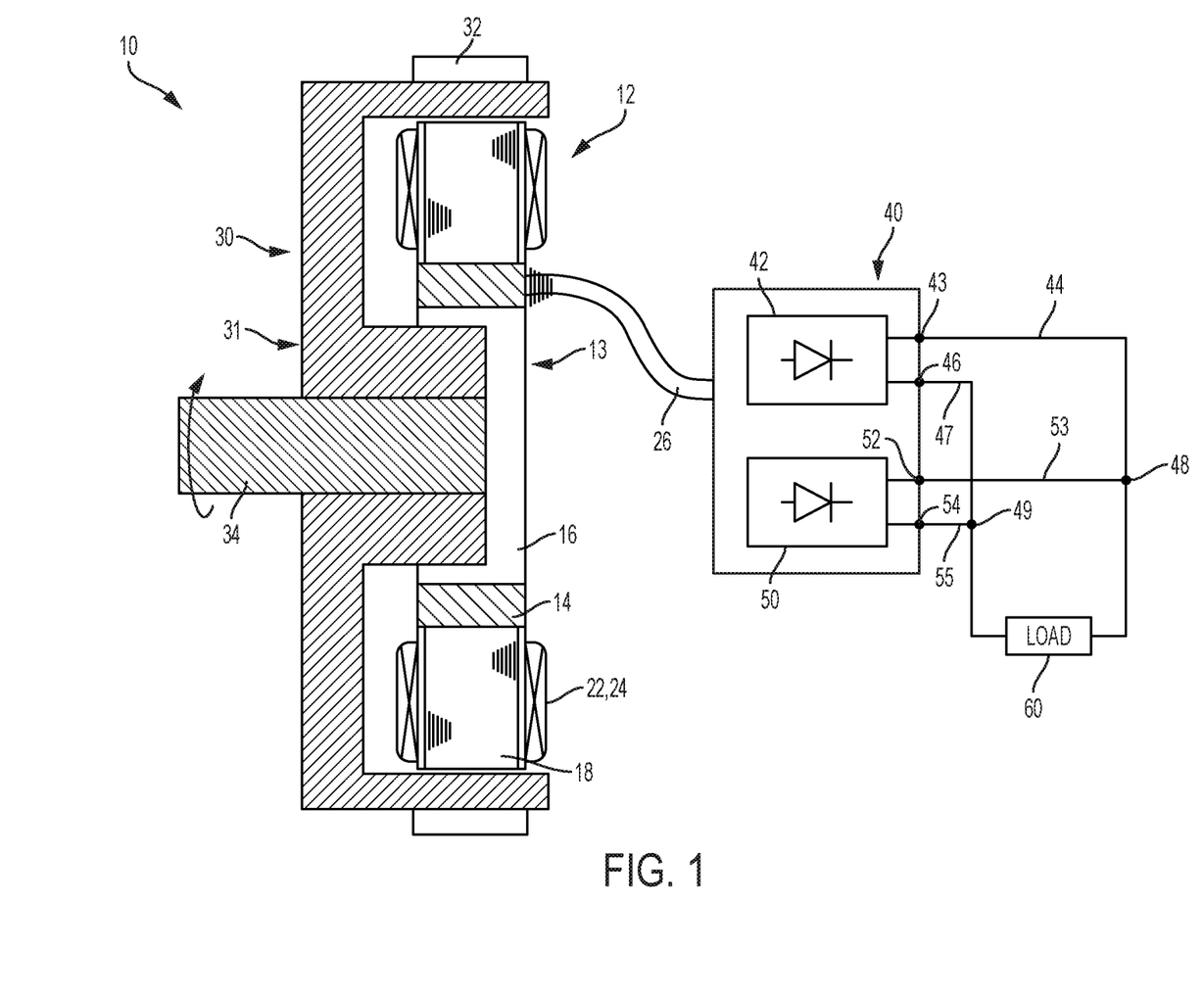
FIG. 1 is a schematic diagram of an embodiment of a permanent-magnet generator.
Figure 10:
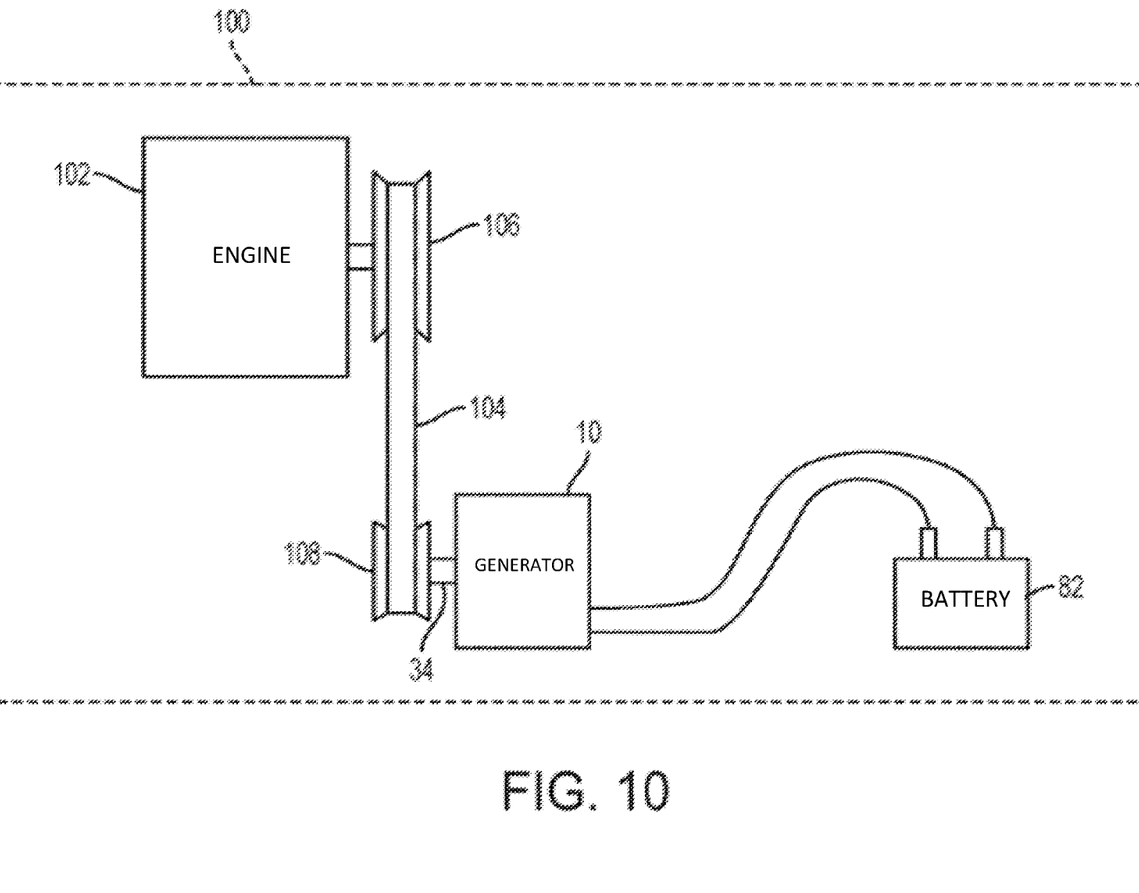
FIG. 10 is a block diagram of a vehicle including a generator.

The foregoing exemplary embodiments of the disclosure will now be described with reference to the figures. FIG. 1 is a schematic diagram of an embodiment of a permanent-magnet (PM) generator 10 provided to generate electrical power from rotational motion. Generator 10 comprises a stator 12 and a rotor 30. Stator 12 comprises a magnetic core 14 with body 13 having a central cavity 16 and a plurality of teeth 18 extending radially from the body. Coils of a first three-phase winding 22 and a second three-phase winding 24 are individually wound on the teeth 18. Rotor 30 comprises a body 31 supporting a plurality of magnetic poles 32 and includes a shaft 34 provided to transfer mechanical power and thus rotate rotor 30. Body 31 may comprise a hub to support magnetic poles 32 adjacent to teeth 18 of magnetic core 14. Magnetic poles 32 may be provided by magnets mounted on the hub or flywheel of body 31. In various embodiments, 12, 16, and 20 magnets are provided. The magnets may be distributed substantially evenly around the rotation axis of the hub. It should be understood that while each magnet has two poles (north and south), only one of the poles is counted for the purpose of determining the number of poles of the magnetic core. More magnets generate more power but can generate excessive pulses and damage the voltage regulators if the rotor rotates at excessive speed. In one example, 20 magnets are used in a generator for a heavy-weight motorcycle, where the rotor speed is limited to about 5,000 RPM, while 12 magnets are used in a generator for an off-road motorcycle, where the rotor speed can exceed about 8,000 RPM. FIG. 10 is a block diagram of a vehicle 100 including a combustion engine 102 and a mechanical transmission comprising a belt 104 and a pair of pulleys 104, 106 coupled to shaft 34 of generator 10, which is electrically coupled to battery 82. In another embodiment, shaft 34 of generator 10 could be directly coupled and collinear with a crankshaft of engine 102. In yet another embodiment, mechanical transmission could be achieved through a gear or a series of gears coupling shaft 34 of generator 10 to engine 102.

Figure 4:
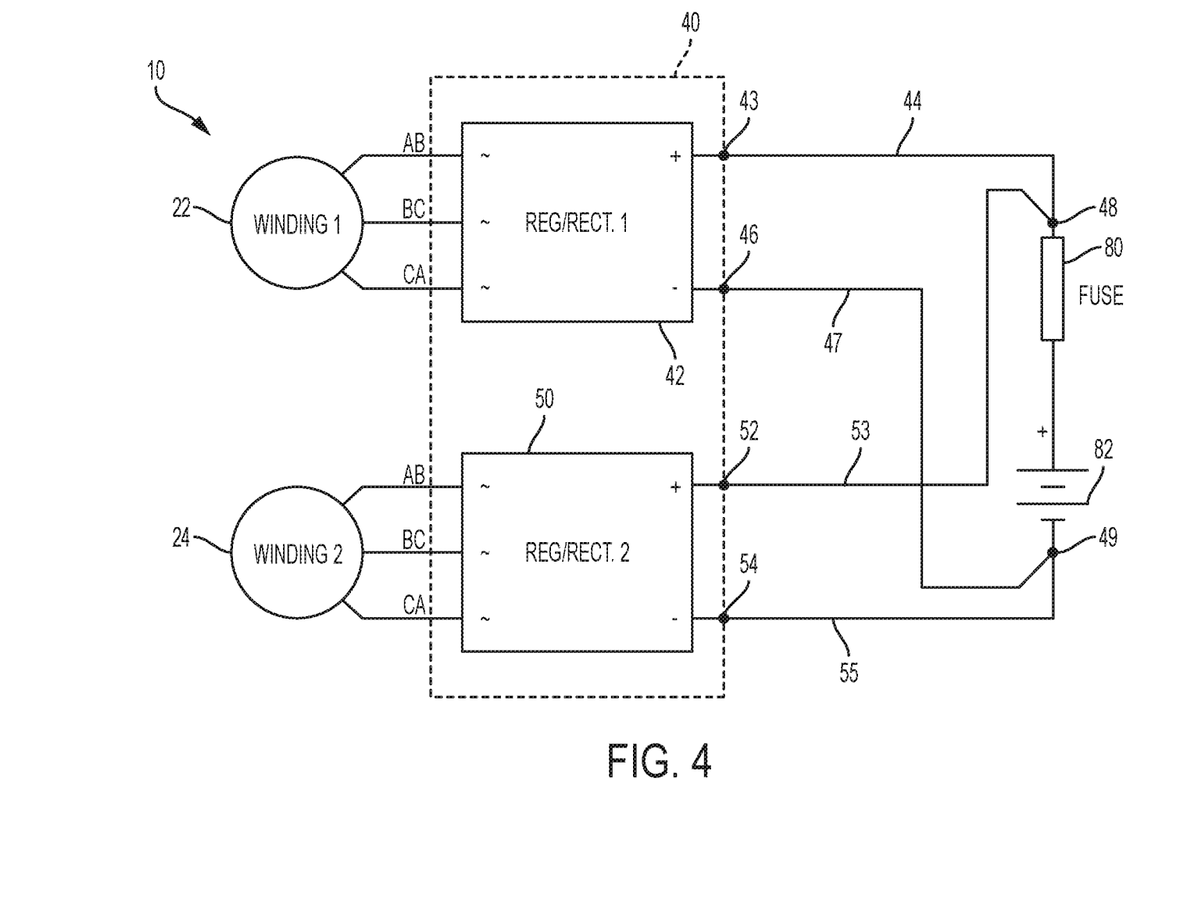
FIG. 4 is another schematic diagram of the embodiment of the generator of FIG. 1.

A cable 26 includes conductors of first three-phase winding 22 and second three-phase winding 24 and connects stator 12 to an AC/DC converter 40 comprising a first AC/DC converter 42 electrically coupled to first three-phase winding 22 (best seen in FIG. 4) and a second AC/DC converter 50 electrically coupled to second three-phase winding 24 (best seen in FIG. 4). Conductors 44 and 53 electrically connect outputs 43 and 52 of first AC/DC converter 42 and second AC/DC converter 50 to a first output node 48, and conductors 47 and 55 electrically connect outputs 46 and 54 of first AC/DC converter 42 and second AC/DC converter 50 to a second output node 49, thereby connecting outputs of first AC/DC converter 42 and second AC/DC converter 50 in parallel to a load 60 connected to first output node 49 and second output node 49.

Advantageously, a generator with two or more three-phase windings on a common magnetic core and coupled to independent AC/DC converters having outputs connected in parallel to a load can generate power more cost effectively than a generator having only one, but larger, AC/DC converter, due to the higher cost of the higher-capacity rectifier, wires, and connectors required by such generator. In one variation of the present embodiment, the generator can conduct about 35 amperes per coil/phase and first and second AC/DC converter 42, 50 are capacitor-less. The outputs of first and second AC/DC converter 42, 50 are connected in parallel to a load that can store energy, therefore smoothing capacitors are not needed to reduce voltage ripple. Absence of capacitors increases reliability.

Figure 2:
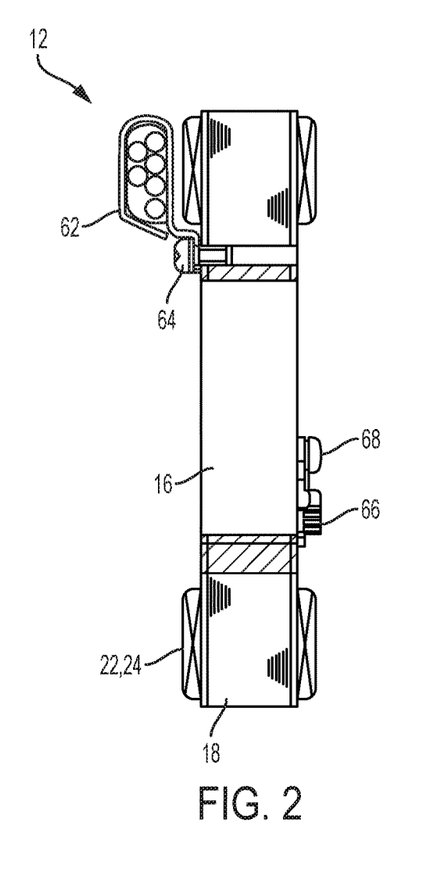
FIGS. 2 and 3 are side and front views of an embodiment of a stator of the generator of FIG. 1.
Figure 3:
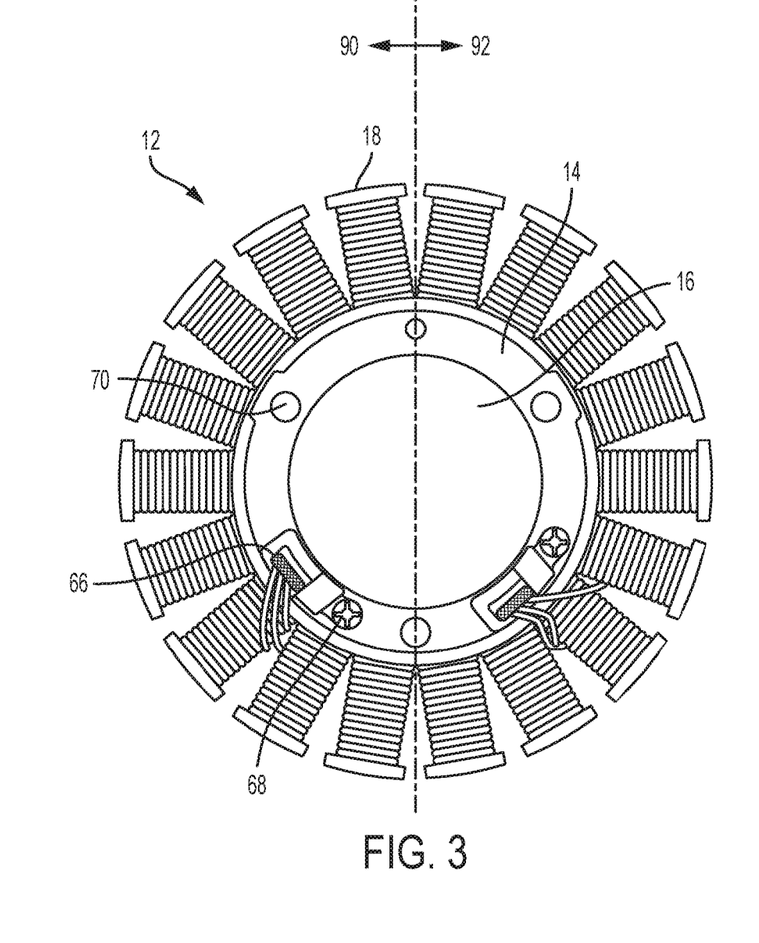

FIGS. 2 and 3 illustrate additional characteristics of stator 12. Referring to FIG. 2, a cable clip 62 supports cable 26 and is connected to body 13 by a screw or bolt 64 secured to a hole 70 (FIG. 3) located on body 13. One or more wire terminals 66 are secured to body 13 by screws or bolts 68. More or less wire terminals 66 are provided depending on the wiring scheme employed to wind the three-phase windings. Magnetic core 14 comprises a first half 90 opposite a second half 92, which are described in detail with reference to FIG. 6. In various embodiments magnetic core 14 comprises 18 teeth, which are 20 mechanical degrees apart. A pair of teeth thus spans 40 mechanical degrees. Diametrically opposite teeth are 180 mechanical degrees apart and coils wound thereon may be in-phase or entirely out of phase depending on whether the coils are wound in the same or opposite direction and also depending on the alignment of the magnetic poles.

Referring now to FIG. 4, first three-phase winding 22 comprises first, second, and third phase windings, which are coupled in delta or wye configurations and thus comprise three output nodes. In the present embodiment the nodes are denoted as AB, BC, and CA representing a delta configuration. In the present embodiment, load 60 comprises a battery 82 and may, optionally, include a fuse 80 connected in series with battery 82.

In one embodiment, first AC/DC converter 42 and second AC/DC converter 50 comprise passive rectifiers. As used herein, a passive rectifier comprises a plurality of circuit elements configured to permit unidirectional current flow. Examples of circuit elements include diodes and silicone controlled rectifiers (SCRs) arranged in a known manner to convert three-phase AC power output by a three-phase winding of generator 12 to DC power. While an SCR comprises a gate and can be configured as a switched element, in the present example the SCR is hard-wired to switch-on in accordance with the polarity of the voltage rather than responsive to a controller, thus it is wired to operate passively, e.g. without dynamic control by a controller. In another embodiment, first AC/DC converter 42 and second AC/DC converter 50 comprise dynamic rectifiers. As used herein, a dynamic rectifier comprises a plurality of switched elements arranged in a known manner to convert three-phase AC power output by generator 12 to DC power. Examples of switched elements include SCRs and insulated-gate bipolar transistors (IGBTs), arranged in a known manner to convert three-phase AC power output by a three-phase winding of generator 12 to DC power, responsive to signals from a controller. A controller is provided to control switching of the switched elements to regulate the output voltage of the AC/DC converter. In one example, the controller is configured to switch the switching elements to limit the output voltage to a predetermined threshold. In other embodiments, one of first AC/DC converter 42 and second AC/DC converter 50 comprises a passive rectifier and the other comprises a dynamic rectifier.

Figure 5:
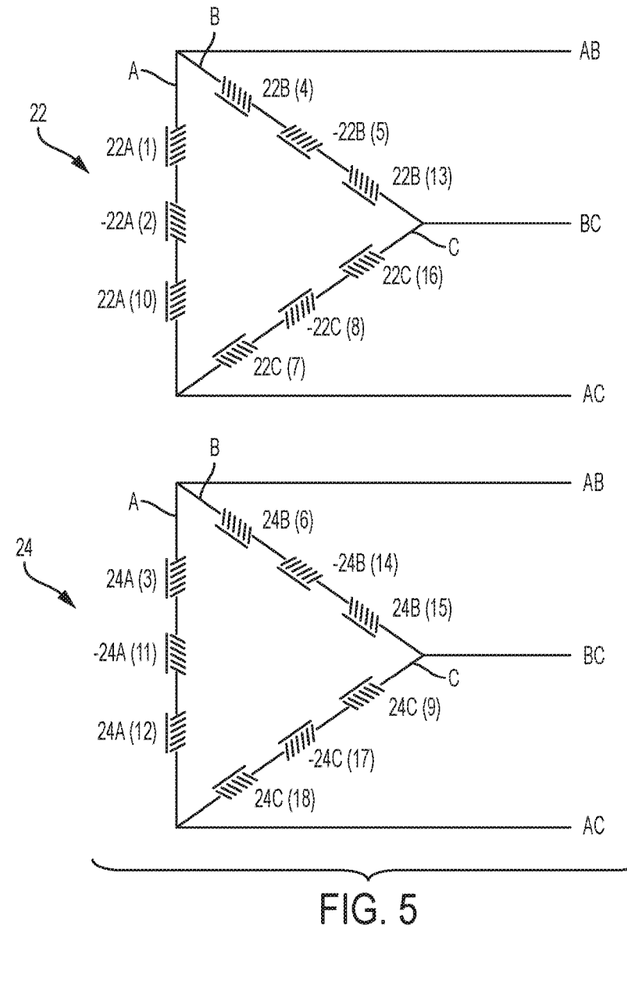
FIG. 5 is a schematic diagram of an embodiment of the windings of the stator of FIGS. 2 and 3 connected in a delta configuration.
Figure 6:
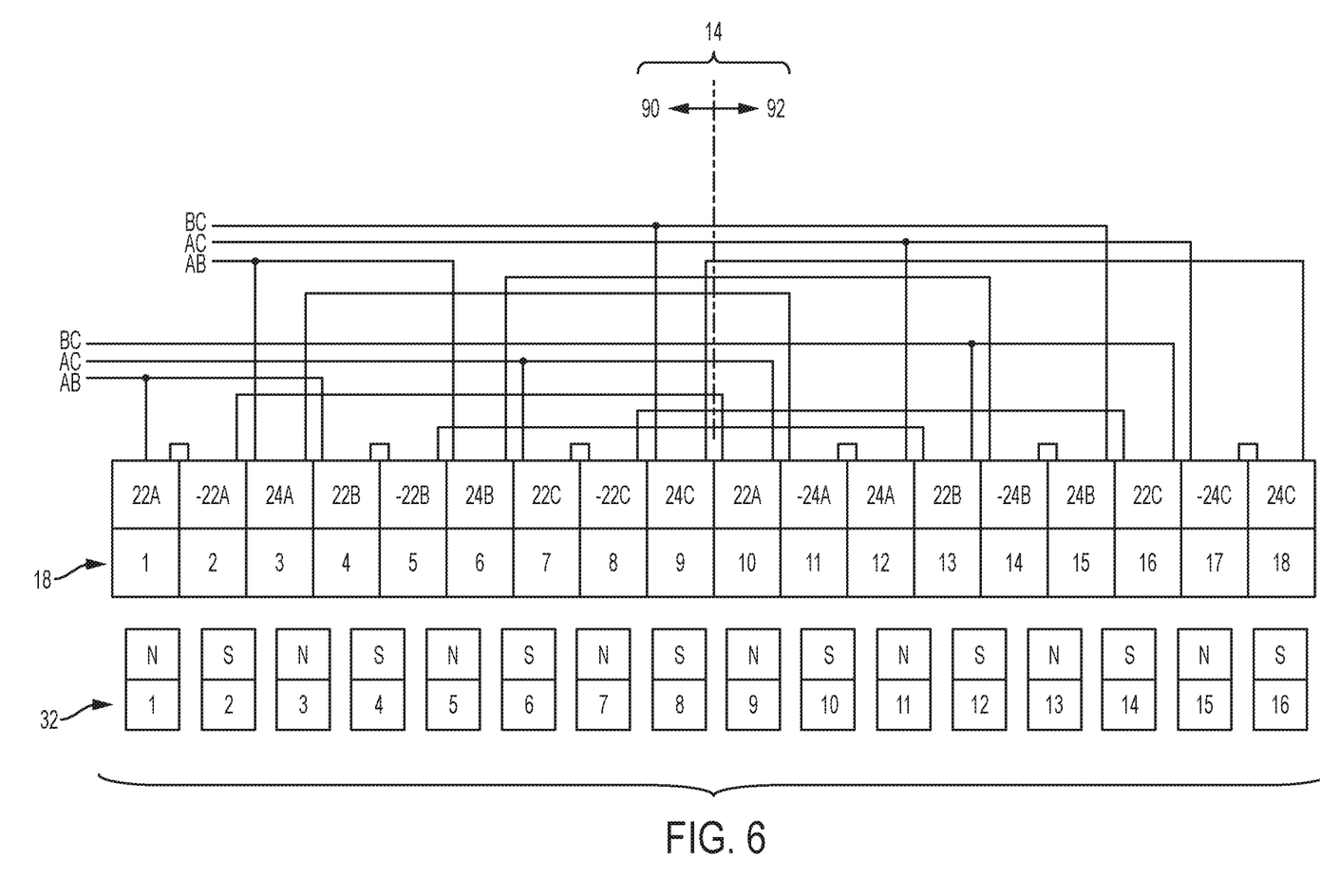
FIG. 6 is a diagram of the windings depicted in FIG. 5 according to one wiring embodiment relative to magnetic poles of an embodiment of a rotor of the generator of FIG. 1.

FIG. 5 is a schematic diagram of an embodiment of the windings of stator 12 wired in the delta configuration. The numbers in parentheses represent the tooth number of a tooth of stator 12 on which the phase wire is wound to form an individual coil. As shown in FIG. 6, stator 12 comprises eighteen teeth 18. In the present embodiment, first three-phase winding 22 includes three coils for the first, or "A", phase (denoted as coils 22A, −22A), three coils for the second, or "B", phase (denoted as coils 22B, −22B), and three coils for the third, or "C", phase (denoted as coils 22C, −22C), where the negative sign indicates that the respective coil is reverse-wound relative to coils with positive signs. Second three-phase winding 24 includes three coils for the A phase (denoted as coils 24A, −24A), three coils for the B phase (denoted as coils 24B, −24B), and three coils for the C phase (denoted as coils 24C, −24C). Wires A, B, C forming first, second and third phase windings are connected at nodes AB, BC, and AC.

Referring now to FIG. 6, a diagram of the windings depicted in FIG. 5 is provided showing the interconnections of the various coils around the magnetic core. Teeth 18 are numbered 1-18 and magnetic poles 32 are numbered 1-16 in the present embodiment. In other embodiments more or less magnetic poles or teeth may be provided. As shown, magnetic core 14 comprises first, radially spanning, half 90 opposite a second, radially spanning, half 92. By radially spanning half it is meant that the magnetic core is divided by a plane passing through its longitudinal axis, such that about 50% of the teeth are positioned on one half and the remainder are positioned on the opposite half of the magnetic core. At least two coils of each of the first, second, and third phase windings of the first three-phase winding are individually wound on teeth positioned next to each other. Thus, for example, coils 22A and −22A are wound on teeth 1 and 2, coils 22B and −22B are wound on teeth 4 and 5, and coils 22C and −22C are wound on teeth 7 and 8. These coils are all wound on teeth located on first half 90 of magnetic core 14. Sequential teeth numbers denote teeth positioned next to each other. Coil 22A wound on tooth 1 generates a voltage that has the opposite polarity of the voltage generated by coil −22A wound on tooth 2, due to coil −22A being reverse wound, when a north pole passes by the corresponding tooth. However, due to the magnetic poles being arranged in reverse polarity to generate a fluctuating magnetic field, and the pitch factor being between, and inclusive, 0.60 to 1.50, teeth 1 and 2 will pass near magnetic poles of opposite polarity at substantially the same time, thus the voltages generated by the coils on teeth 1 and 2 will have the same polarity. The pitch factor is calculated by dividing the coil span by the ratio of slots to poles. Because the coils are individually wound on each tooth, the coil span equals 1 and the pitch factor is simplified to the ratio of poles to slots. If there are 16 poles and 18 slots, the pitch factor equals 0.89.

In the present embodiment, the third coil of a particular phase winding is wound on a tooth that is positioned diametrically opposite the coil of the at least two coils having the same polarity. For example, coils 22A are wound on teeth 1 and 10. Since there are 18 teeth, tooth 1 is diametrically opposite to tooth 10. Stated differently, the diametrically opposite tooth T2 is determined by the equation T2=T1+n/2, where T1 is the first tooth, T2 is the diametrically opposite tooth, and n is the total number of teeth. With a pitch factor between and inclusive 0.60 to 1.50, the voltage generated by the coil wound on the diametrically opposite tooth will have the same polarity as the two coils located next to each other, with the teeth strongly aligned with corresponding magnetic poles to generate maximum voltage. As the teeth alignment to the coils decreases, so does the voltage output. Teeth alignment is a function of the number of teeth and magnetic poles.

Figure 7:
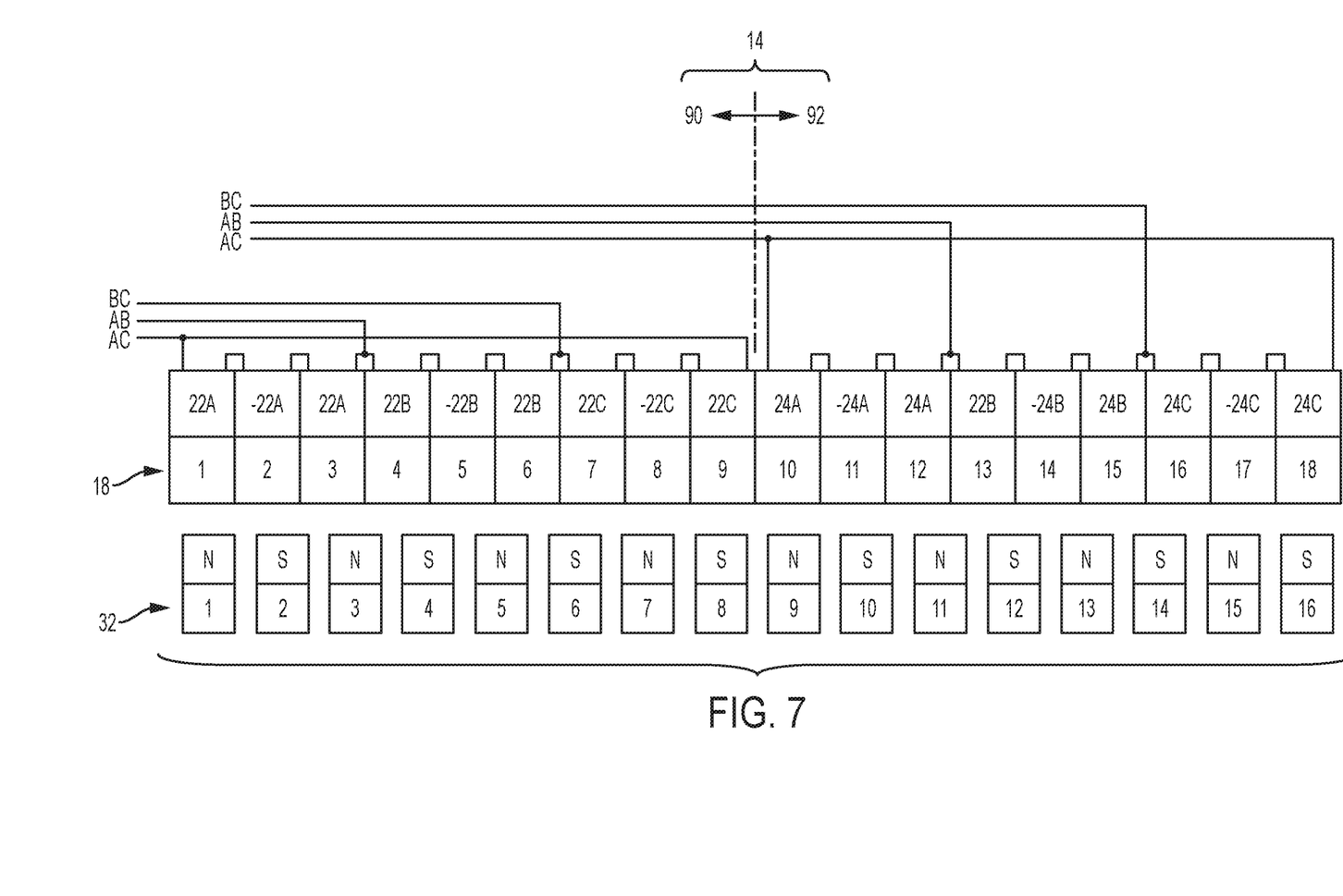
FIG. 7 is a diagram of the windings depicted in FIG. 5 according to another wiring embodiment relative to magnetic poles of the embodiment of the rotor of FIG. 6.

FIG. 7 is a diagram of the windings depicted in FIG. 5 according to another wiring embodiment relative to magnetic poles of the embodiment of the rotor of FIG. 6. In the present embodiment, all of the coils of the first phase winding of the first three-phase winding are individually wound on teeth positioned next to each other. Thus, coils 22A and −22A are wound on teeth 1, 2, and 3. Similarly, coils 22B and −22B are wound on teeth 4, 5, and 6, and coils 22C and −22C are wound on teeth 7, 8, and 9. Therefore, all of the coils of first three-phase winding 22 are wound on teeth located on first half 90 of magnetic core 14, and all of the coils of second three-phase winding 24 are wound on teeth located on second half 92 of magnetic core 14. As can be appreciated from the wiring connections shown in FIG. 7 connecting the various coils relative to the wiring connections shown in FIG. 6, it is simpler to wind a phase wire on teeth located next to each other than to wind coils on teeth that are not next to each other. Placing all the coils of a phase next to each other thus reduces complexity.

Figure 8:
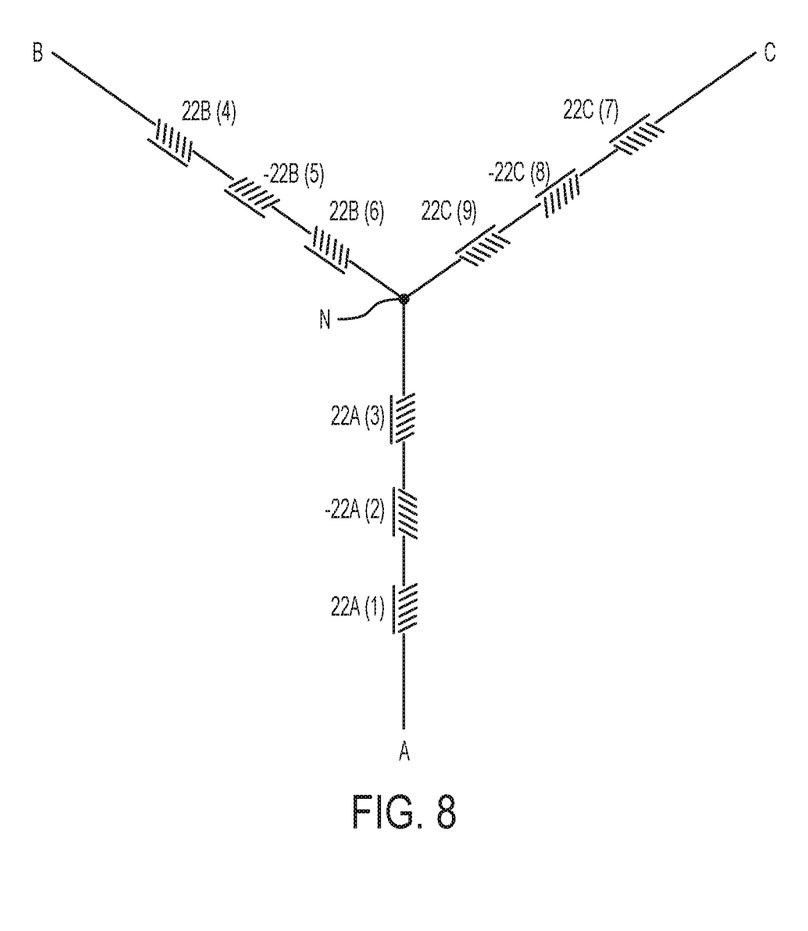
FIG. 8 is a schematic diagram of an embodiment of the windings of the stator of FIGS. 2 and 3 connected in a wye configuration.
Figure 9:
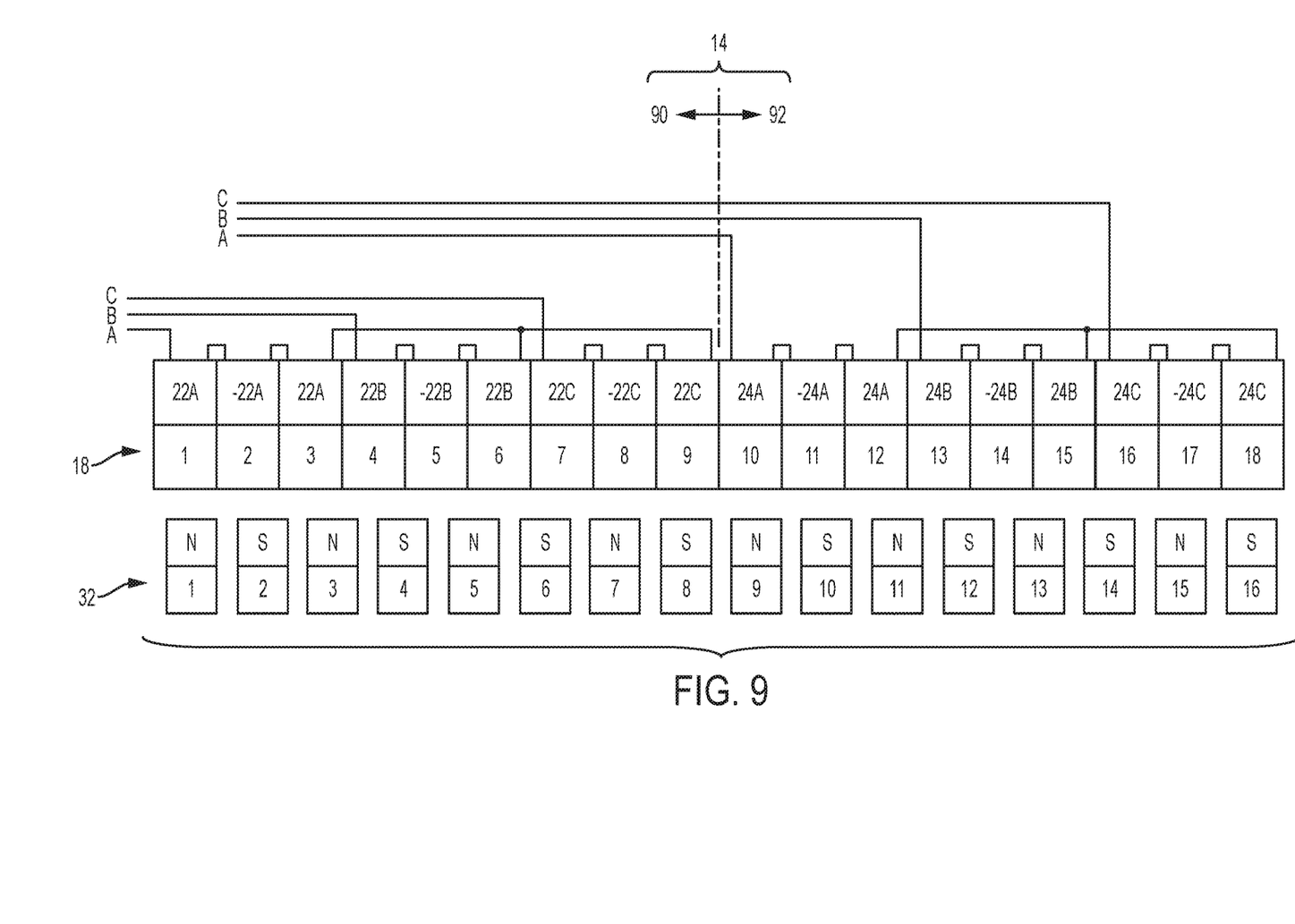
FIG. 9 is a diagram of the windings depicted in FIG. 8 according to another wiring embodiment relative to magnetic poles of the embodiment of the rotor of FIG. 6.

FIG. 8 is a schematic diagram of three-phase winding 22 connected in a wye configuration and FIG. 9 is a diagram of the windings depicted in FIG. 8 relative to magnetic poles of the embodiment of the rotor of FIG. 6. As shown in FIG. 8, phase windings A, B, and C are connected to a common node "N" in the wye configuration with the coils of each winding positioned next to each other. For example, the coils of phase A are wound on teeth 1, 2, and 3, while the coils of phase B are wound on teeth 4, 5, and 6, and the coils of phase C are wound on teeth 7, 8, and 9. Referring to FIG. 9, it can be seen that coils wound on teeth 3, 6, and 9 are connected together wile coils wound on teeth 1, 4, and 7 provide the output leads of phases A, B, and C, as can also be seen on FIG. 8.

While the embodiments described herein are described with reference to a rotor having sixteen magnetic poles, it should be understood that more or less magnetic poles may be provided. In one embodiment, the rotor has 12 magnetic poles. In another variation, the rotor has 20 magnetic poles. As described herein, in various embodiments coils may be individually wound around each of the teeth of the magnetic core. Accordingly, each coil is wound around only one tooth and no coil overlaps another coil. The coils may be wound by wire having a common diameter for each of the coils. Alternatively, one of the three-phase windings may comprise more coils than another and may comprise different wire diameter.

Analogously, the stator may have more or less teeth and the windings may comprise phases comprising more than three coils. In one embodiment, the rotor has 12 magnetic poles and the stator two 3-phase windings with each phase having two coils, thereby having 12 coils wound on 12 teeth. In one variation of the present embodiment, the phases are wound sequentially, e.g. 22A-22B-22C-22A-22B-22C-24A-24B-24C-24A-24B-24C. In one example of the present variation, the generator comprises four regulators, each regulator coupled to one set of coils for each three-phase winding, e.g. 22A-22B-22C, 22A-22B-22C, 24A-24B-24C, and 24A-24B-24C. In another example, pair coils of each phase are wound sequentially, e.g. 22A-22A-22B-22B-22C-22C-24A-24A-24B-24B-24C-24C. In another embodiment, the stator comprises 3 three-phase windings and 3 regulators, and each phase comprises two coils. In a further embodiment, the stator comprises 24 teeth. In one variation of the present embodiment, the generator comprises two regulators and each phase comprises four coils. In another variation, the generator comprises four regulators and each phase comprises two coils. The number of teeth and coils can be determined in relation to the number of magnetic poles, the expected rotational speed of the rotor, and the capacity of the rectifiers to change from a non-conducting to a conducting state. A certain amount of hysteresis must be accounted for and as the speed of rotation of the rotor increases, the rectifiers can no longer perform as expected. Accordingly, at lower rotational speeds more teeth and magnetic poles can be provided, while at faster rotational speed fewer magnetic poles and teeth should be provided. Of course these variables can also be adjusted if faster switching devices or rectification elements are incorporated in the AC/DC converters.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A generator to generate electrical power from rotational motion, comprising:

a rotor including a plurality of magnetic poles; and a stator including a magnetic core comprising a body and a plurality of teeth extending radially from the body and defining a plurality of slots therebetween, the stator also comprising a first three-phase winding and a second three-phase winding, each of the first three-phase winding and the second three phase-winding comprising first, second, and third phase windings, wherein the first, second, and third phase windings of the first three-phase winding and the second three phase-winding comprises a plurality of coils, wherein each of the plurality of coils is individually wound on a different tooth of the plurality of teeth, wherein each of the first, second, and third phase windings of the first three-phase winding and the second three phase-winding comprise at least three coils of the plurality of coils, wherein at least two coils of the three coils of each of the first, second, and third phase windings of the first three-phase winding are individually wound on a respective tooth positioned on a first radially spanning half of the magnetic core and at least one coil of the three coils of each of the first, second, and third phase windings of the first three-phase winding is wound on a tooth positioned on a second radially spanning half of the magnetic core opposite the first radially spanning half, and wherein at least two coils of the three coils of each of the first, second, and third phase windings of the second three-phase winding are individually wound on a respective tooth positioned on the second radially spanning half of the magnetic core and at least one coil of the three coils of each of the first, second, and third phase windings of the second three-phase winding is wound on a tooth positioned on the first radially spanning half.

2. The generator of claim 1, further comprising a first AC/DC converter electrically coupled to the first three-phase winding and having positive and negative outputs, and a second AC/DC converter electrically coupled to the second three-phase winding and having positive and negative outputs connected to the positive and negative outputs, respectively, of the first AC/DC converter, the positive and negative outputs of the first AC/DC converter and of the second AC/DC converter adapted to power a load.

3. The generator of claim 2, wherein the first AC/DC converter comprises a passive three-phase rectifier.

4. The generator of claim 2, wherein the first AC/DC converter comprises a capacitor-less AC/DC converter.

5. The generator of claim 1, wherein the generator has a pitch factor between, and inclusive, 0.60 to 1.50.

6. The generator of claim 5, wherein the stator comprises 18 teeth and the rotor comprises 16 magnetic poles.

7. The generator of claim 1, wherein the plurality of teeth extending radially from the body consist of 18 teeth, wherein 9 consecutive teeth of the 18 teeth define the first radially spanning half of the magnetic core, and wherein at least 6 of the coils of the first three-phase winding are wound on teeth of the 9 consecutive teeth that define the first radially spanning half of the magnetic core.

8. The generator of claim 1, wherein:
the at least two coils of the first three-phase winding are individually wound on a first tooth and a second tooth of the plurality of teeth, and wherein the first tooth and the second tooth are positioned adjacent to each other on the first radially spanning half, and
the at least two coils of the second three-phase winding are individually wound on a third tooth and a fourth tooth of the plurality of teeth, and wherein the third tooth and the fourth tooth are positioned adjacent to each other on the second radially spanning half.

9. The generator of claim 8, wherein the first coil is wound with a reversed polarity relative to the second coil, and the third coil is wound with a reversed polarity relative to the fourth coil.

10. A method of manufacturing a generator, comprising:
providing a rotor including a plurality of magnetic poles;
providing a magnetic core comprising a body and a plurality of teeth extending radially from the body and defining a plurality of slots therebetween; and
individually winding first, second, and third phase conductors of a first three-phase winding and a second three-phase winding around a different tooth of the plurality of teeth to form coils, each of the first, second, and third phase windings of the first three-phase winding and the second three-phase winding comprising two at least three coils of the plurality of coils,
wherein at least two coils of the three coils of each of the first, second, and third phase windings of the first three-phase winding are individually wound on a respective tooth positioned on a first radially spanning half of the magnetic core and at least one coil of the three coils of each of the first, second, and third phase windings of the first three-phase winding is wound on a tooth positioned on a second radially spanning half of the magnetic core opposite the first radially spanning half, and wherein at least two coils of the three coils of each of the first, second, and third phase windings of the second three-phase winding are individually wound on a respective tooth positioned on the second radially spanning half of the magnetic core and at least one coil of the three coils of each of the first, second, and third phase windings of the second three-phase winding is wound on a tooth positioned on the first radially spanning half.

11. The method of claim 10, further comprising connecting the first three-phase winding to a first AC/DC converter, connecting the second three-phase winding to a second AC/DC converter, and connecting outputs of the first AC/DC converter and the second AC/DC converter in parallel to a load.

12. The method of claim 10, wherein:
the at least two coils of the first three-phase winding are individually wound on a first tooth and a second tooth of the plurality of teeth, and wherein the first tooth and the second tooth are positioned adjacent to each other on the first radially spanning half, and
the at least two coils of the second three-phase winding are individually wound on a third tooth and a fourth tooth of the plurality of teeth, and wherein the third tooth and the fourth tooth are positioned adjacent to each other on the second radially spanning half.

13. The method of claim 12, wherein the first coil is wound with a reversed polarity relative to the second coil, and the third coil is wound with a reversed polarity relative to the fourth coil.

* * * * *